Oct. 11, 1966    E. GORDY    3,278,799

PHOTO FLASH SYSTEM

Filed July 14, 1964

INVENTOR.
EDWIN GORDY

BY
*Busser, Smith & Harding*

ATTORNEYS

3,278,799
PHOTO FLASH SYSTEM
Edwin Gordy, 39 Woodgate Road, Tonawanda, N.Y.
Filed July 14, 1964, Ser. No. 382,445
4 Claims. (Cl. 315—171)

This invention relates to lighting systems for use in still photography, and has particular reference to systems which produce a flash of light when the shutter of a camera is opened.

In photography, and particularly in portrait photography, it is ordinarily necessary to illuminate the subject with bright floodlights while preparing to photograph the subject, so that shadows may be adjusted for proper modeling. Bright light from the floodlamps is usually very annoying to the subject.

It has not been satisfactory to provide separate bulbs of low intensity for illumination of the subject during preparation, because these bulbs are not in the same position as the floodlights used for the actual taking of the picture. Attempts to lower the intensity of illumination of floodlamps have not been satisfactory since lowering of the voltage supplied to floodlamps, which are usually of high power, involves the use of rather expensive variable transformers or resistors.

The general object of the present invention, therefore, is to provide a simple photographic lighting system which provides both normal and high-intensity illumination from a single lamp or a single set of lamps.

A somewhat similar problem arises in microphotography. Particularly if color photography is involved, the illumination must be of high intensity if exposures are to be short, and the intensity will be much higher than that desired for visual adjustment. Yet during that adjustment the light source should be in the same position as to be used during the photographic exposure. High intensity lamps, because of the heat involved, are not conveniently used in association with removable filters.

As another example giving rise to problems, there may be considered photography using bronchoscopes or the like. Low intensity illumination must be used during visual placement or adjustment; whereas high intensity illumination must be used for photography if short exposures are to be made.

A further object of this invention is to provide a system which permits proper adjustment of shadows or other illumination, and only produces high-intensity illumination during a short period of time surrounding or within the period during which the shutter of a camera is opened.

A still further object of this invention is to provide a photographic lighting system which may utilize ordinary, standard voltage bulbs.

Figure 1:
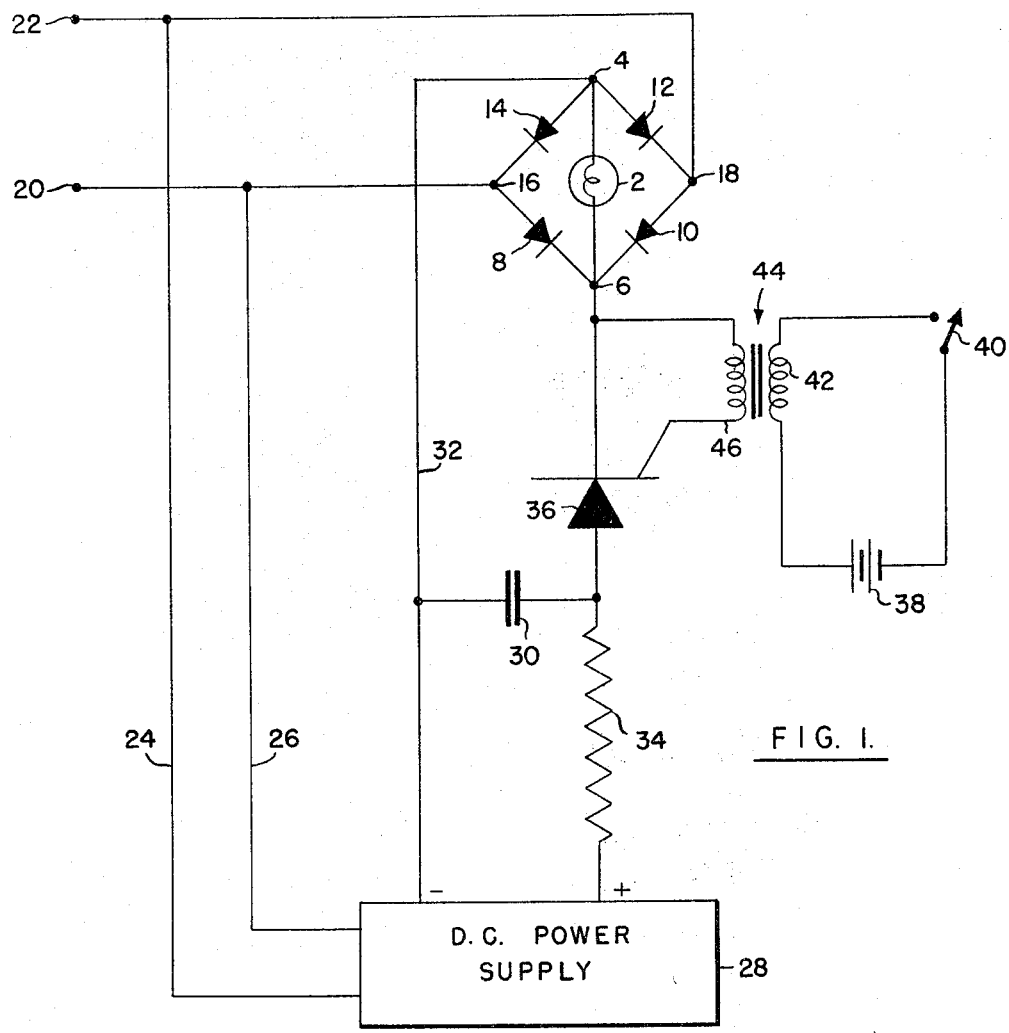
Figure 2:
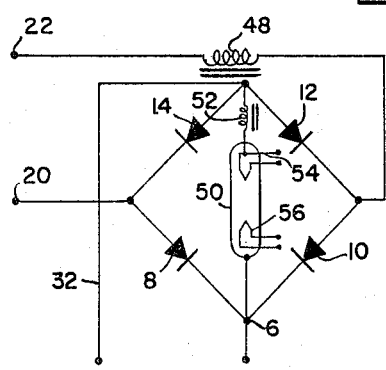

These and other objects and features of the invention will become apparent from the following description read in conjunction with the accompanying drawing in which:

FIGURE 1 is a schematic diagram showing electrical circuitry in accordance with the present invention in conjunction with an ordinary light bulb which will be seen to be adaptable for high intensity photographic illumination; and FIGURE 2 is a schematic diagram showing the necessary modification of the invention to adapt it for use in conjunction with a fluorescent lamp.

For simplicity and consistency of description the invention will be first described in the setting of portrait photography.

Referring to FIGURE 1, an ordinary, 110–120 volt, 100 watt household light bulb 2 is shown connected between output terminals 4 and 6 of a bridge rectifier comprising solid state (e.g. silicon) rectifiers 8, 10, 12 and 14. (If more than a single source of light is involved, of course, a plurality of such bulbs may be connected in parallel.) Terminals 16 and 18 of the bridge rectifier are supplied with the nominally 110 volt alternating current from terminals 20 and 22 respectively. Leads 24 and 26 supply alternating current power to the input of a direct current power supply 28. A capacitor 30, which is typically of the order of 150 microfarads, though the capacity may be considerably higher depending on the lamp load, is connected, at one end, to the negative terminal of power supply 28 through lead 32. The other side of capacitor 30 communicates with the positive terminal of power supply 28 through resistor 34. The negative terminal of power supply 28 is connected directly to one side of lamp 2 through lead 32. The anode of a silicon controlled rectifier 36 is connected to the junction between capacitor 30 and resistor 34. Its cathode is connected directly to lamp 2 at terminal 6. The control circuit of silicon controlled rectifier 36, comprising the series combination of battery 38 and switch 40, is connected across the primary winding 42 of an isolation transformer 44. Secondary winding 46 is connected between the gate and the cathode of the silicon controlled rectifier.

Switch 40 is a switch which is included in most cameras internally, and which closes momentarily as the shutter of the camera opens, i.e., it is synchronized with the camera shutter. Usually this switch is used for firing flash bulbs; here it is used to control the silicon controlled rectifier.

When silicon controlled rectifier 36 is in a non-conducting condition, lamp 2 is supplied with pulsating direct current from output terminals 4 and 6 of the bridge rectifier. Lamp 2 is lit approximately to the same brilliance as it would be if it were connected directly across alternating current supply terminals 20 and 22, since full wave rectification is involved with the diodes polarized as shown, and since their voltage drops are quite small during forward conduction.

Capacitor 30 is charged through resistor 34 to a voltage which is nearly equal to the voltage existing between the output terminals of power supply 28. This voltage is typically of the order of 400 volts. When switch 40 is closed, in synchronism with the opening of the camera shutter, a gate control pulse is delivered through transformer 44 to the gate of silicon controlled rectifier 36. Upon the delivery of the gate control pulse, the silicon controlled rectifier conducts and delivers the charge on capacitor 30 through lamp 2.

Synchronization may be adjusted in conventional fashion to insure bright illumination at the proper time.

The heavy surge of charge through lamp 2 from capacitor 30 causes the intensity of light from lamp 2 to increase to a value which is typically more than four times the normal intensity. This increased intensity lasts only for about 1/20 to 1/10 of a second. It will be apparent that, during the period during which charge from the capacitor passes through the lamp, the diodes of the bridge rectifier are reverse-biased so that no interaction can occur between the alternating current line and the circuit comprising the silicon controlled rectifier, capacitor 30 and power supply 28. Energization of lamp 2 due to current from terminals 20 and 22 is interrupted during this period.

It can be seen that, after capacitor 30 discharged to a voltage such that the voltage drop across silicon controlled rectifier 36 is small, the silicon controlled rectifier will cease to conduct, and capacitor 30 will again charge in a short time to a voltage corresponding approximately to the voltage existing between the terminals of the power supply. The circuit is then ready to be fired again by closure of switch 40. Resistor 34 has sufficiently high resistance to insure that the silicon controlled rectifier reverts to its non-conducting state.

It will be apparent that a number of lamps may be placed in parallel with lamp 2, and that the number is only limited by the ratings of the rectifiers, the silicon controlled rectifier, and by the value of capacitor 30. The maximum D.C. voltage applied to the capacitor is limited only by the silicon controlled rectifier and the diodes used.

Referring to FIGURE 2, the diode bridge arrangement of FIGURE 1 is shown with the essential modifications necessary to adapt the circuit for operation of one or more fluorescent lamps in a manner similar to that described above for incandescent lamps.

A ballast choke 48, typically of the order of 8 henries, is inserted in the line communicating A.C. power terminal 22 with terminal 18. Chokes of this type are often used in conjunction with fluorescent bulbs for limiting current. A fluorescent lamp 50 and a small series choke 52 are connected in series to bridge terminals 4 and 6 of the diode arrangement. Lamp 50 is provided with internal filaments 54 and 56 which are heated by means of separate external, low-voltage supplies.

The operation of the modified circuit is similar to the operation of the incandescent lamp circuit and the only essential difference is the requirement for a high starting voltage for the fluorescent lamp. This may be obtained by providing conventional means for producing a high voltage starting transient between terminals 20 and 22. Alternatively, the voltage supplied between terminals 20 and 22 can be provided by a variable A.C. source which is capable of delivering the necessary starting voltage and which may be adjusted to give the desired normal illumination intensity.

As a third alternative, the lamp might be operated by 110 volts A.C. across terminals 20 and 22 with starting accomplished by a high-voltage surge from capacitor 30. In using this starting system, it is desirable to provide an additional starting switch in parallel with the shutter switch 40 of the camera. After the lamp has been started by the charge on capacitor 30, capacitor 30 will recharge and closure of shutter switch 40 will cause silicon controlled rectifier 36 to conduct and flash lamp 50.

With fluorescent lamps, peak-to-average brightness ratios greater than 60 to 1 can be obtained with no shift in color temperature. That is, spectral characteristics of fluorescent lamps do not change substantially with brightness. Consequently, this embodiment of the invention is particularly applicable to color photography.

It will be apparent that the duration of the flashing pulse delivered to lamp 50 is dependent on the size of choke 52. For example, if capacitor 30 is chosen to be 525 microfarads and is charged to approximately 400 volts, a choke 52 of 800 millihenries will determine a pulse duration of approximately 100 milliseconds, while a choke of 50 millihenries will determine a pulse duration of approximately 20 milliseconds.

It will be immediately obvious, then, that a small choke is desirable for use with cameras with ordinary, between-the-lenses shutters so that the energy stored in the capacitor is delivered to the lamp within a very short duration while the shutter is open.

When cameras with focal-plane shutters are used, substantially uniform brightness over an extended period of time is necessary, since, even at a nominal shutter speed setting of 1/200 sec., the shutter might well be crossing the film plane over a period exceeding 1/20 sec. Therefore, it is desirable to provide light of substantially constant brightness over the entire period of shutter movement. Knowing the period of shutter movement of a particular camera one can choose a choke which will give a pulse which is substantially flat-topped over that period.

Both embodiments of the present invention are particularly applicable to color photography, wherein a considerably greater amount of light is necessary than in ordinary black and white photography. In addition, the invention is applicable to microphotography, wherein it is often necessary to provide a low-intensity light source for adjusting specimens and for focusing, while it is necessary to provide a light source of high-intensity in exactly the same position for photographing.

Likewise, in medical photography using bronchoscopes or other internal instruments, it may be desirable to use a single light source both for visual adjustment and for photographing. The invention is clearly applicable for use in conjunction with miniature light sources such as, for example, grain-of-wheat bulbs. The parameters of the circuit may be changed so that they may be operated at proper lower voltages but sufficient to produce bright flashing.

It will be apparent that the construction and arrangement of parts of the apparatus herein disclosed may be varied without departing from the scope of the invention. Accordingly, it is not desired to be limited except as required by the following claims.

What is claimed is:

1. A lamp flashing apparatus comprising a bridge rectifier supplying pulsating direct current to a pair of terminals for the normal operation of at least one lamp, a capacitor, means supplying direct current for the charging of said capacitor, and switching means operable to deliver the charge on said capacitor to said pair of terminals as a high current pulse, said bridge rectifier including means for cutting off the delivery of said pulsating direct current to said pair of terminals when said switching means is operated to produce said high current pulse.

2. A lamp flashing apparatus comprising a bridge rectifier supplying pulsating direct current to a pair of terminals for the normal operation of at least one lamp, a capacitor, means supplying direct current for the charging of said capacitor, a silicon controlled rectifier adapted to deliver the charge on said capacitor to said pair of terminals, and means operable to deliver a triggering signal to the gate of said silicon controlled rectifier to render it conductive, said bridge rectifier including means for cutting off the delivery of said pulsating direct current to said pair of terminals when said silicon controlled rectifier is conducting.

3. A lamp flashing apparatus comprising a bridge rectifier supplying pulsating direct current to a pair of terminals for the normal operation of at least one lamp, a capacitor, means supplying direct current for the charging of said capacitor to a voltage substantially in excess of the normal operating voltage of said lamp, and switching means operable to deliver the charge on said capacitor to said pair of terminals as a high current pulse, said bridge rectifier including means for cutting off the delivery of said pulsating direct current to said pair of terminals when said switching means is operated to produce said high current pulse.

4. A lamp flashing apparatus comprising a bridge rectifier supplying pulsating direct current to a pair of terminals for the normal operation of at least one lamp, a capacitor, means supplying direct current for the charging of said capacitor to a voltage substantially in excess of the normal operating voltage of said lamp, a silicon controlled rectifier adapted to deliver the charge on said capacitor to said pair of terminals, and means operable to deliver a triggering signal to the gate of said silicon controlled rectifier to render it conducting, said bridge rectifier including means for cutting off the delivery of said pulsating direct current to said pair of terminals when said silicon controlled rectifier is conducting.

References Cited by the Examiner

UNITED STATES PATENTS 3,191,060   6/1965   Mahoney _____ 307—88.5
3,198,984   8/1965   Franke _____ 315—241

JOHN W. HUCKERT, *Primary Examiner.*

L. ZALMAN, J. D. CRAIG, *Assistant Examiners.*